June 26, 1962  E. R. STOVER ETAL  3,040,580
TEMPERATURE SENSITIVE DEVICE
Filed Nov. 2, 1960
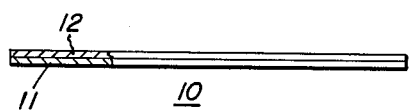
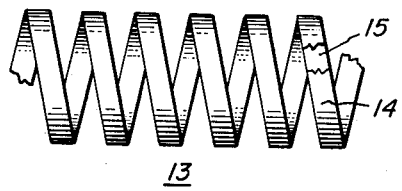
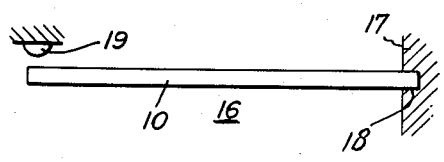
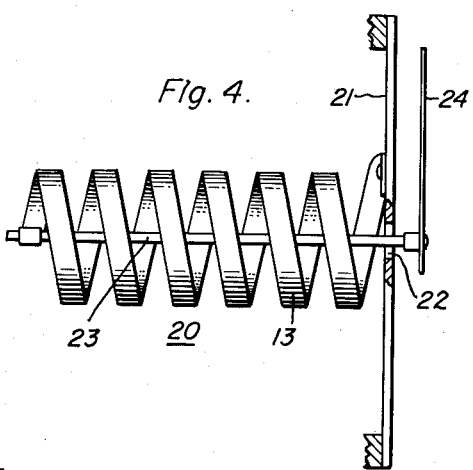
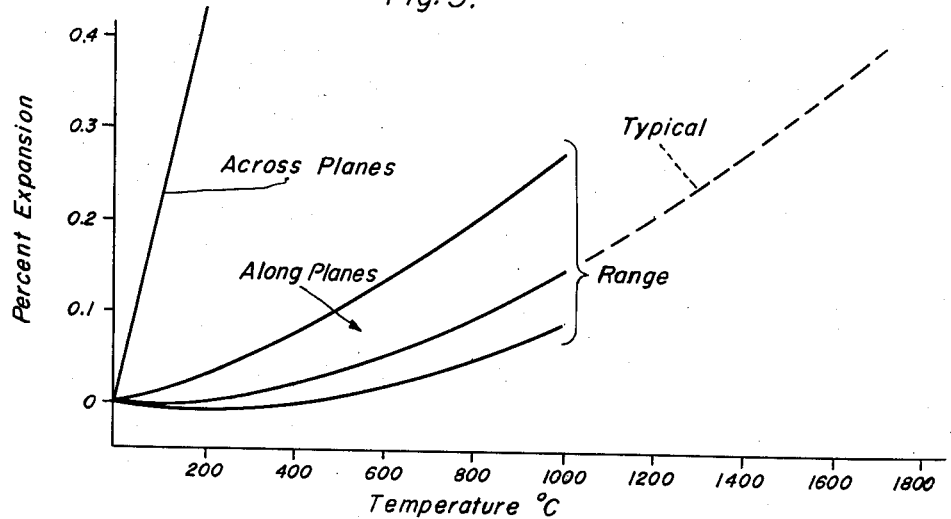
Inventors:
Edward R. Stover;
Richard M. Williams,
by Paul R. Webb, II
Their Attorney.

United States Patent Office 3,040,580
Patented June 26, 1962

3,040,580
TEMPERATURE SENSITIVE DEVICE
Edward R. Stover, Schenectady, and Richard M. Williams, Porter Corners, N.Y., assignors to General Electric Company, a corporation of New York
Filed Nov. 2, 1960, Ser. No. 66,807
9 Claims. (Cl. 73—363.5)

This invention relates to temperature sensitive devices and more particularly to such devices with elements in helical or strip form containing two layers of the same material bonded together.

Present temperature sensitive devices which employ bimetallic elements are used in thermometers and in thermostatic controls to measure and control temperatures up to approximately 1000° C. The temperature range of such devices might be expanded to about 2000° C. by choosing suitable different high temperature materials for the bimetallic elements. However, a serious materials problem exists to provide a bimetallic element which will operate above 2000° C. Thus, it would be desirable if the temperature sensitive element of the device were composed of two layers of the same material bonded together rather than employing a welded or riveted bimetallic strip. Furthermore, it would be advantageous for the element to be sensitive over a wide temperature range including temperatures above 2000° C.

In copending patent application Serial No. 58,732 filed September 27, 1960 and assigned to the same assignee as present application, there is disclosed and claimed a temperature sensitive device including an element selected from the group consisting of pyrolytic graphite and boron nitride.

It is an object of our invention to provide a temperature sensitive device with a temperature sensitive element employing two layers of the same material bonded together.

It is another object of our invention to provide a temperature sensitive device operable over a wide temperature range.

It is another object of our invention to provide a temperature sensitive device with an element employing two layers of the same material, each layer of which has a different thermal expansion.

It is a further object of our invention to provide a temperature sensitive device with a temperature sensitive element of pyrolytic graphite.

In carrying out our invention in one form, a layer of pyrolytic graphite is bonded to another layer of pyrolytic graphite, each layer of which has a different thermal expansion to provide a temperature sensitive element.

These and various other objects, features and advantages of the invention will be better understood from the following description taken in connection with the accompanying drawing in which:

FIGURE 1 is a sectional view of a temperature sensitive element embodying our invention;

FIGURE 2 is an elevational view of a modified temperature sensitive element embodying our invention;

FIGURE 3 is an elevational view of a temperature sensitive device employing the temperature sensitive element shown in FIGURE 1;

FIGURE 4 is an elevational view of a modified temperature sensitive device employing the temperature sensitive element shown in FIGURE 2; and FIGURE 5 is a graph showing thermal expansion versus temperature of pyrolytic graphite both across and along the planes thereof.

In FIGURE 1 of the drawing, a temperature sensitive element 10, in the form of a strip, has a layer 11 of pyrolytic graphite with a relatively high thermal expansion. A layer 12 of pyrolytic graphite with a lower thermal expansion is bonded to layer 11.

In FIGURE 2 of the drawing, a modified temperature sensitive element 13 in the form of a helix has a layer 14 of pyrolytic graphite with a relatively high thermal expansion. A layer 15 of pyrolytic graphite with a lower thermal expansion is bonded to layer 14.

Present temperature sensitive devices employ temperature sensitive elements consisting of two thin, flat strips of different metals welded or riveted together. One of the metals has a larger thermal expansion than the other metal whereby the flat element bends into a curve when it is heated. When such an element is used as a thermostat, one end of the strip is fixed to a support and the motion of the other end is made to open and close an electrical control circuit. A conventional oven thermometer consists of a bimetallic strip coiled in a helix. With changes in temperature, the helix winds up or unwinds, and this motion is transmitted to a pivoted pointer which moves over a calibrated scale.

We discovered unexpectedly that a layer of pyrolytic graphite with a specific thermal expansion could be bonded to another layer of pyrolytic graphite with a relatively high thermal expansion to form a temperature sensitive element of a single material. Pyrolytic graphite is defined as a polycrystalline material made from carbonaceous gases by thermal decomposition or from a carbonaceous material by evaporation and deposition on a surface in which the planar graphite crystallites are aligned into a layer structure. Our research disclosed additionally that this material could be employed without the inclusion of a metal or without welding or riveting the layers together.

As shown in FIGURE 1 of the drawing, a temperature sensitive element 10 consists of two layers of pyrolytic graphite which are bonded together. Each layer has a different thermal expansion whereby the element bends into a curve it is heated and straightens when it is cooled. A range of thermal expansion curves for pyrolytic graphite are shown in FIGURE 5 in which thermal expansion is plotted against temperature both across and along the planes thereof. High thermal expansion is obtained by controlling conditions of deposition to include many particles of fine soot in the deposit. Similarly, a lower density deposit exhibits high thermal expansion. Both these conditions which result from increasing chamber pressure in deposition or decreasing temperature at constant pressure are associated with lower preferred orientations. Pyrolytic graphite which has low thermal expansion does not contain such soot particles and has less than 1% to 2% voids. The low thermal expansion pyrolytic graphites are identified from the curve labeled "typical" to the lower curve of the range area in FIGURE 5. Layers 11 and 12 can be bonded together by several methods to provide a suitable element 10. For example, layers 11 and 12 can be bonded together by an agent, such as pitch, tar, or "C-6," a carbon cement produced by National Carbon Company, a division of Union Carbide Corporation, New York, New York.

Layer 11 is produced from a carbonaceous gas by thermal decomposition or from a carbonaceous material by evaporation and deposition on a surface. Layer 12 is deposited subsequently by one of these methods directly on layer 11. However, we prefer to deposit layer 11 on a molybdenum, tungsten or graphite surface from a carbonaceous gas or material which is followed immediately by deposition of layer 12 on layer 11 to produce an element which is subsequently removed from the surface. For example, a graphite surface is positioned within each of a series of enclosures which are evacuated to $10^{-4}$ mm. of mercury. A carbonaceous gas, such as methane, is preheated and introduced into the enclosures which are heated by induction coils to temperatures in the range of 800° C. to 900° C. and are at pressures of 1 to 10 mm. of mercury. After three to four hours, layers 11 having thicknesses of 1 to 10 mils are produced on the molybdenum surfaces. The temperatures are raised to the range of 1900° C. to 2000° C. for a period of 30 to 60 minutes without interrupting the individual gas flow to deposit layers 12 on layers 11. Each of the two layers is bonded together by this process to provide temperature sensitive elements 10 having thicknesses of 5 to 50 mils. The elements are then removed from the plates. The different thermal expansion of the layers provides temperature sensitive elements of a single material which are useful over a wide temperature range.

Additionally, a layer of pyrolytic graphite can be deposited onto one surface of a thin slice cut through an initial thick pyrolytic graphite layer. The cut is made perpendicular to the proposed deposit surface to obtain greater sensitivity.

As shown in FIGURE 2 of the drawing, a temperature sensitive element 13 in the form of a helix has a layer 14 of pyrolytic graphite. A layer 15 of pyrolytic graphite with a higher thermal expansion is bonded to layer 14. Since the layers have different thermal expansion element 13 will uncoil when heated and will coil when cooled. It is also possible to bond layers 14 and 15 together by several methods to provide a suitable element 13. For example, a cylinder of pyrolytic graphite is placed within an outer cylinder of the same material with a relatively high thermal expansion and the cylinders are bonded together by an agent therebetween, such as pitch, tar, or "C–6" compound referred to above. The cylinder is then cut to produce the helix.

However, we prefer to deposit layers 14 and 15 within a graphite cylinder from a carbonaceous gas or material. The layers form a cylinder within the graphite cylinder which is then cut into a helix and the inner helix is removed therefrom. For example, a plurality of graphite cylinders are heated, and are evacuated to $10^{-4}$ mm. of mercury while a carbonaceous gas is supplied thereto. The cylinders are heated to temperatures in the range of 1900° C. to 2500° C. for 30 to 60 minutes to produce layers 14. The temperatures are then lowered to the range of 800° C. to 900° C. for a period of three to four hours without interrupting the individual gas flow to deposit layers 15 on layers 14. These layers form cylinders having thicknesses of 3 to 30 mils within the graphite cylinders which are then cut into helixes and the inner helixes are removed to form elements 13.

In FIGURE 3 of the drawing, a temperature sensitive device 16 is shown which includes a support 17 with a slot 18 therein to which one end of a temperature sensitive element 10 of pyrolytic graphite is affixed. An electrical conductive button 19, which is a part of an electrical control circuit (not shown), is positioned adjacent to the free end of element 10. In operation, a predetermined increase in temperature causes element 10 to curve and make contact with button 19 thereby closing the circuit. A predetermined decrease in temperature causes element 10 to break contact with button 19 thereby opening the circuit.

In FIGURE 4 of the drawing, a modified temperature sensitive device 20 is shown which includes a support 21 with a centrally disposed aperture 22 therein, a temperature sensitive element 13 in the form of a helix affixed at one end to support 21 and affixed at the other end to a rod 23, and a pointer 24 secured to rod 23. Pointer 24 moves over a calibrated scale on the face of support 21 and is actuated by rod 23 through aperture 22. If desired, the calibrated scale is located on a separate member and positioned between support 21 and pointer 24. In the operation of device 20, element 13 will uncoil when heated and will coil when cooled. The movement of element 13 in response to temperature changes is transmitted to rod 23 which moves pointer 24 over the calibrated scale on support 21.

When operating temperatures above 2000° C. are encountered, a neutral atmosphere of argon or helium is used to surround the element 10 or 13. Carbon monoxide or natural gas can also be utilized for this purpose. Thus, a temperature sensitive device 16 or 20 with a pyrolytic graphite element 10 or 13 can be used in a high temperature furnace at temperatures above 2000° C. for prolonged periods of time.

While other modifications of this invention and variations of structure which may be employed within the scope of the invention have not been described, the invention is intended to include such that may be embraced within the following claims.

What we claim as new and desire to secure by Letters Patent of the United States is:

1. A temperature sensitive element comprising a first layer of pyrolytic graphite, a second layer of pyrolytic graphite bonded to said first layer, and each of said layers having a different thermal expansion.

2. A temperature sensitive element comprising a layer of pyrolytic graphite, a second layer of pyrolytic graphite deposited on said first layer, and each of said layers having a different thermal expansion.

3. A temperature sensitive element comprising a first layer of pyrolytic graphite, a second layer of pyrolytic graphite bonded to said first layer, and each of said layers having a different density.

4. In a temperature sensitive device including supporting means, and temperature indicating means, the combination therewith of a temperature sensitive element affixed to said supporting means and adapted to actuate said temperature indicating means, said element comprising a first layer of pyrolytic graphite, a second layer of pyrolytic graphite bonded to said first layer, and each of said layers having a different thermal expansion.

5. In a temperature sensitive device including supporting means, and temperature indicating means, the combination therewith of a helical temperature sensitive element affixed to said supporting means and adapted to actuate said temperature indicating means, said element comprising a first layer of pyrolytic graphite, a second layer of pyrolytic graphite bonded to said first layer, and each of said layers having a different thermal expansion.

6. In a temperature sensitive device including supporting means, and temperature indicating means, the combination therewith of a strip temperature sensitive element affixed to said supporting means and adapted to actuate said temperature indicating means, said element comprising a first layer of pyrolytic graphite, a second layer of pyrolytic graphite bonded to said first layer, and each of said layers having a different thermal expansion.

7. A method of forming a temperature sensitive element which comprises providing a first layer of pyrolytic graphite, bonding a second layer of pyrolytic graphite having a different thermal expansion to said first layer.

8. A method of forming a temperature sensitive element which comprises providing a first layer of pyrolytic graphite, depositing a second layer of pyrolytic graphite having a different thermal expansion on said first layer.

9. A method of forming a temperature sensitive element which comprises depositing a first layer of pyrolytic graphite on a surface, depositing a second layer of pyrolytic graphite having a different thermal expansion on said first layer, and removing said element from said surface.

No references cited.